Aug. 23, 1955 WOLJA SARAGA 2,716,220
DISSIPATION COMPENSATED PHASE SHIFT NETWORK
Filed Nov. 27, 1953 4 Sheets-Sheet 1

INVENTOR:-
Wolja Saraga,
BY
Pierce, Scheffler & Parker
ATTORNEYS.

INVENTOR:-
Wolja Saraga,
BY Pierce, Scheffler & Parker,
ATTORNEYS.

INVENTOR:-
Wolja Saraga,
BY
Pierce, Scheffler + Parker,
ATTORNEYS.

INVENTOR:-
Wolja Saraga,
BY
Pierce, Scheffler & Parker
ATTORNEYS.

United States Patent Office 2,716,220

Patented Aug. 23, 1955

2,716,220

DISSIPATION COMPENSATED PHASE SHIFT NETWORK

Wolja Saraga, Orpington, England, assignor to Telephone Manufacturing Company Limited, a British company Application November 27, 1953, Serial No. 394,825

Claims priority, application Great Britain February 16, 1953

4 Claims. (Cl. 333—29)

This invention relates to electrical impedance networks of the type producing a constant loss and a varying phase shift with varying frequency.

It would be possible at least in theory, to design networks having this property, if ideal reactive elements having no resistive or dissipative components were available. Such "idealized" networks are impossible of construction, however, since ideal reactances free from resistive components do not exist.

Objects of the present invention are to provide dissipation-compensated phase shift networks which produce a constant loss and a phase shift which varies with frequency, thus simulating an idealized phase shift network although the constant loss is somewhat higher than would be the case for a corresponding phase shift network without dissipation.

Figure 7:
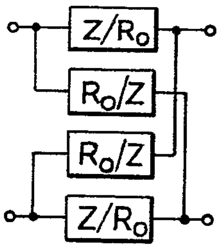
Figure 8:
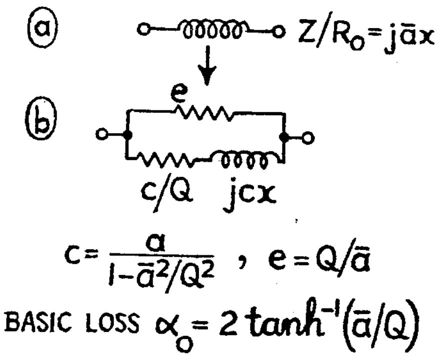
Figure 9:
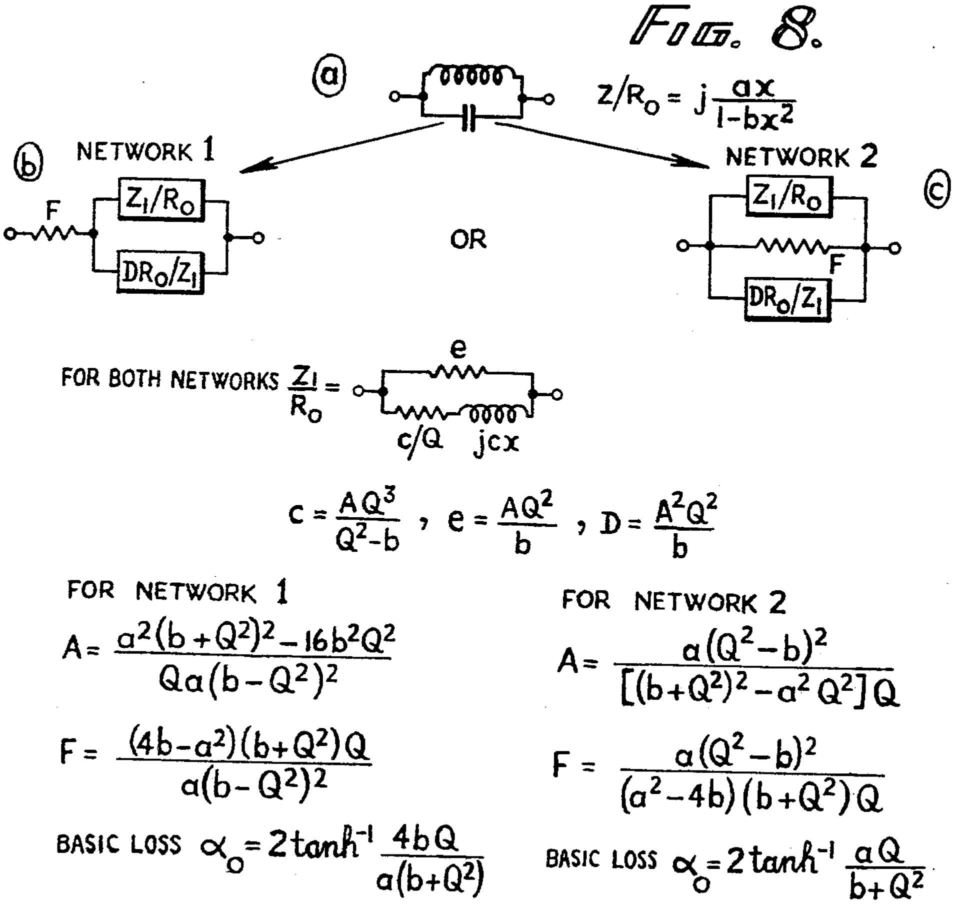

This and other objects and the advantages of the invention will be apparent from the following specification when taken with the accompanying drawings in which:

Figs. 1 to 6 are diagrams of idealized phase shift networks in which the reactances are ideal reactances free from resistive components; and Figs. 7 to 9 are circuit diagrams of dissipation compensated phase shift networks and elements thereof in accordance with this invention.

Figure 1:
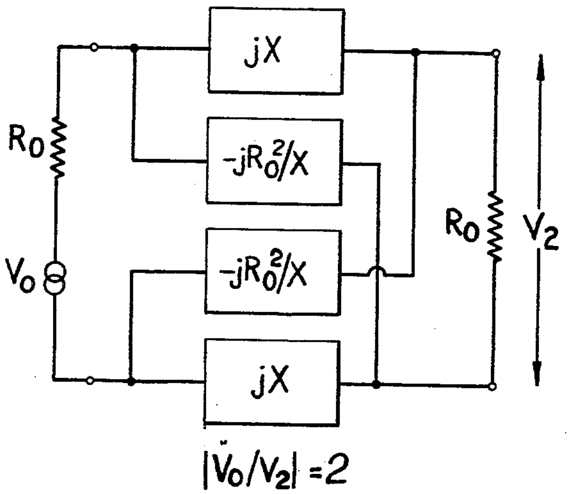
Figure 5:
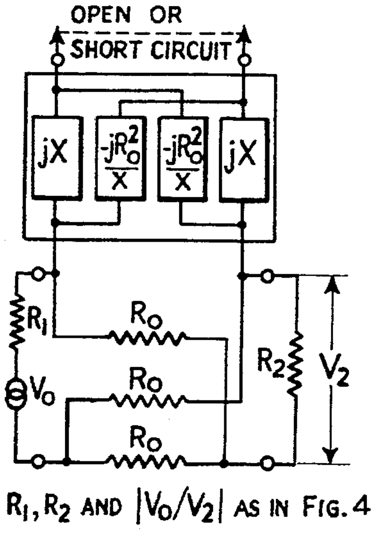
Figure 6:
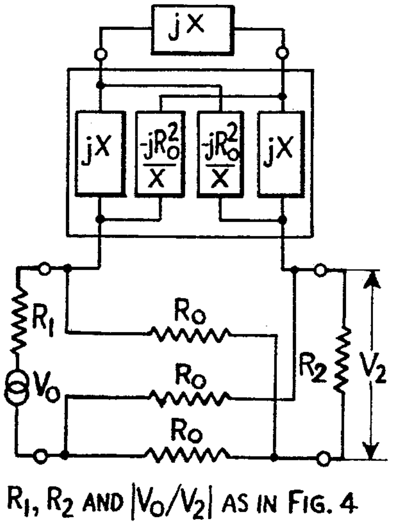

As shown in Fig. 1, for example, one known type of idealized phase shifting network consists of a single section lattice network with series arm reactances $jX$ and lattice arm reactances $-jR_0^2/X$ inserted between equal resistances $R_0$, its phase shift is given by $\beta=2$ $$\tan^{-1}(X/R_0)$$

If the source voltage is $V_0$ and the voltage produced across the output termination is $V_2$ then the modulus of the voltage transfer ratio $V_0/2V_2$) is $$\left|\frac{V_0}{2V_2}\right|=1$$

and the attenuation in decibels is $$\alpha=20\log_{10}\left|\frac{V_0}{2V_2}\right|=0$$

Figure 2:
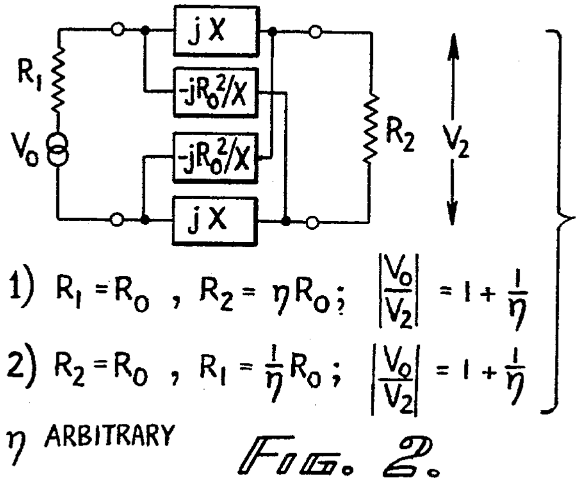

It is possible to alter one of these resistance $R_0$ without altering the phase shift; then a basic "flat loss" occurs, that is, the attentuation is increased uniformly through the frequency range by a given amount in the manner indicated in Figure 2. In Figure 2, the two resistances $R_0$ are shown as replaced by resistances $R_1$ and $R_2$ respectively.

With this network, if $R_1=R_0$ and $R_2=\eta R_0$, where $\eta$ is an arbitrary constant, then the modulus of the voltage transfer ratio is given by $$\left|\frac{V_0}{2V_2}\right|=\tfrac{1}{2}\left(1+\frac{1}{\eta}\right) \quad (1)$$

Alternatively if $R_2=R_0$ and $$R_1=\frac{1}{\eta}R_0$$

then Equation 1 still holds. These relations are shown in the legend to Figure 2. It will be seen that for $\eta=1$, i. e. for the case shown in Figure 1, Equation 1 becomes $$\left|\frac{V_0}{2V_2}\right|=1$$

i. e., the correct relation for Figure 1.

Figure 3:
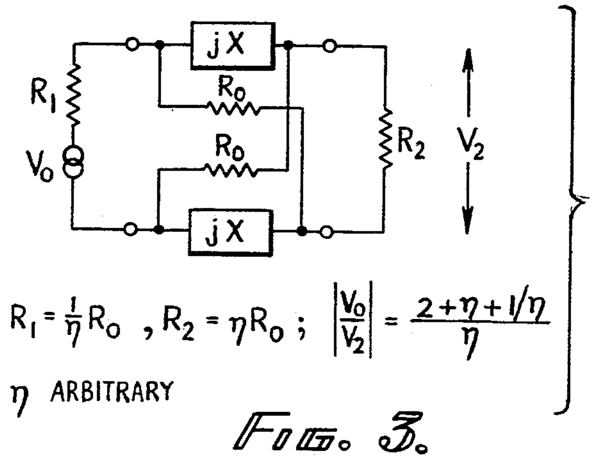

It is possible to replace the two lattice arm reactances by resistances $R_0$ without altering the phase shift, in the manner indicated in Figure 3. Then, if the source and load resistance are both equal to $R_0$ a flat loss of 6 db is produced as compared with the circuit of Figure 1. It is possible to make the source resistance $$\frac{1}{\eta}R_0$$

and the load resistance $\eta R_0$ when an addition flat loss depending on $\eta$ is produced, without altering the phase shift characteristic. The modulus of the voltage transfer ratio $V_0/2V_2$ is then given by the relation:

$$\left|\frac{V_0}{2V_2}\right|=\frac{2+\eta+\frac{1}{\eta}}{2\eta} \quad (2)$$

It will be seen that for $\eta=1$ Equation 2 becomes $$\left|\frac{V_0}{2V_2}\right|=2$$

which corresponds to a loss of 6 db, compared with Equation 1 in the case $\eta=1$.

Figure 4:
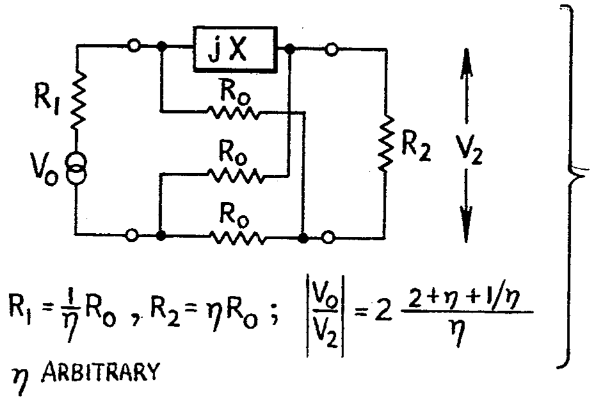

It is possible to replace one of the two remaining reactive arms by a resistance $R_0$ without altering the phase shift, in the manner shown in Figure 4. In this case, the modulus of the voltage transfer ratio $V_0/2V_2$ is given by $$\left|\frac{V_0}{2V_2}\right|=\frac{2+\eta+\frac{1}{\eta}}{\eta} \quad (3)$$

Thus, if $\eta=1$ the basic loss is 12 db instead of 6 db. Two other types of phase shift networks, shown restively in Figures 5 and 6 can be shown to be special cases of the network of Figure 4 but with more reactive elements than are necessary for producing the phase shift actually produced. The circuit in Figure 4 can be replaced in known manner by a hybrid circuit or by one of a number of so-called half-lattice networks which are driven from a balanced source.

For instance, half lattice networks have been described by R. B. Dome, Electronics, December 1946, p. 112 et seq., in an article entitled "Wide band phase shift networks," by D. G. C. Luck, Proc. I. R. E., vol. 37, Pt. 1, 1949, p. 147 et seq., in an article entitled "Properties of some wide band phase splitting networks" and by the present applicant in British Patent No. 653,696.

Figure 4A:
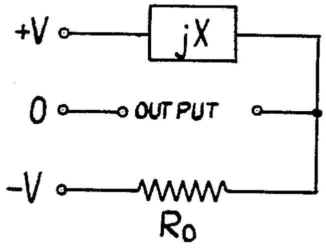
Figure 4B:
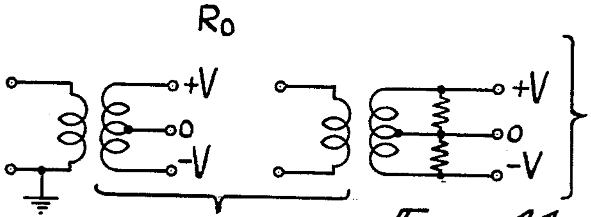
Figure 4C:
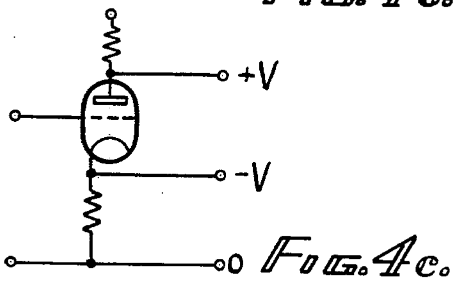

The principal advantage of half lattice networks in respect to the present invention is that, being electrical alternatives to the network shown in Figure 4, they employ a single resistive arm with impedance $jX$ as shown in Figure 4*a*. The two phase input voltage, i. e., two voltages of equal amplitude but opposite phase, required by such networks may be derived by one of the circuits shown in Figure 4*b* or 4*c* and reference may also be made to the previously quoted British Patent No. 653,696 and to Figures 13 and 14 of an article entitled "An aerial analogue computer," by W. Saraga, D. T. Hadley and F. Moss appearing in the Jnl. Brit. I. R. E., vol. 13, No. 4, p. 201 et seq., April 1953.

Figure 4D:
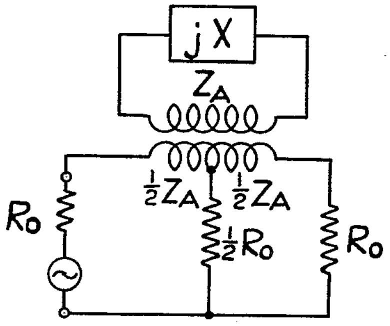

A hybrid circuit equivalent to the network shown in Figure 4 is illustrated in Figure 4*d* but it will be realised that this is only one of many such equivalent hybrid circuits which are well known. Reference may also be made to Figure 4 of British Patent No. 653,696 previously quoted. In the circuit shown in Figure 4*d*, ZA and ½ZA are the impedances of the three windings of the transformer.

In the networks of the invention, the ideal reactances of the ideal phase shift networks, such as those of Figures 1 to 5, are replaced by arms consisting of dissipative reactances and additional resistances, and the nature of these arms will be more particularly described hereinafter. Before proceeding to this description, however, it is convenient to point out a generalisation of ideal phase shift networks.

The phase shift networks described above and shown in Figures 1 to 5 are completely determined by the impedance of one of the reactive arms of the network. For example, in Figures 1 to 5, all the networks are determined by the impedance $jX$, and this impedance, identified as Z will be called the characteristic impedance of the network. In the ideal networks of Figures 1 to 5, the impedance Z is purely reactive, namely $Z=jX$. The impedances of the other reactive arms are equal to $jX$, or to the inverse form $R_0^2/Z$ that is, $-jR_0^2/X$ where $R_0$ is a constant resistance value, which within certain limits—taking the values of the source resistance and load resistance into account—can be given an arbitrary value. The resistive arms of the networks are then $R_0$.

It should be appreciated that, in any of the phase shift circuits under discussion, replacing the impedance $jX$ by its inverse form $R_0^2/jX$ and vice versa results only in a phase reversal i. e. a constant phase shift of 180°. This constant phase shift is of no practical significance as it can be eliminated by a conventional reversal of terminals, thus any of the circuits shown are equivalent to a circuit derived from the example by replacing all impedances $jX$ by $R_0^2/jX$ and vice versa. This truth also applied to circuits shown with a single reactive impedance such as Figures 4, 4*a* and 4*d*.

As Z determines the phase shift network completely, the phase shift $\beta$ produced by the network can be expressed in terms of $Z=jX$ only. The transfer constant $\theta=\alpha+j\beta$ of the phase shift network, where $\alpha$ has the dimension of a loss in nepers but is zero as long as Z is purely reactive and $\beta$ is the phase shift in radians, is given by the relation $$\theta=\alpha+j\beta=2\tan^{-1}(Z/R_0) \qquad (4)$$

$$\text{or } \theta=\beta=2\tan^{-1}(X/R_0) \qquad (5)$$

when $\alpha=0$ and $Z=jX$ for the case of zero dissipation.

Dissipation occurring in the reactive elements of a phase shift network which has been designed under the assumption of zero dissipation produces in general two undesirable effects; the loss $\alpha$ is no longer constant but varies with frequency, and the phase shift $\beta$ actually produced by the dissipative reactance X differs from the phase shift which would be obtained with the same reactance X without dissipation.

In carrying out the present invention there are three considerations which apply. In the first place it is well known that any phase shift/frequency curve which can be produced by a passive network can be produced by a number of "elementary" phase shift networks in tandem, where an "elementary" network is a network with the characteristic impedance $jR_0\bar{a}x$ in the case of a one-parameter network or a network with the characteristic impedance $jR_0ax/(1-6x^2)$ in the case of a two-parameter network, where $x$ is the normalised frequency $f/f_{ref}$, $f_{ref}$ being an arbitrary reference frequency and $\bar{a}$, $a$, $b$ are suitably chosen real parameters. Thus the first impedance is that of an inductance, while the second that of a parallel tuned circuit. It is therefore sufficient to provide dissipation-compensated versions of one-parameter and two-parameter phase shift networks, the problem of providing a more complex phase shift network with dissipation compensation being solvable by connecting a number of such elementary dissipation compensated networks in tandem.

In the second place, the incidence of dissipation will necessarily increase the basic loss, but it is possible to make the loss constant in spite of the presence of dissipation if resistances are added to the dissipative reactances in such a way as to make the characteristic impedance to be of the form $$Z=R_0\frac{c+jX/R_0}{1+jcX/R_0}=R_0\tanh\frac{\alpha_0+j\beta}{2} \qquad (6)$$

where X is of the form of a physically possible ideal reactance without dissipation and $$\alpha_0=2\tanh^{-1}C$$

is a constant loss (in nepers) independent of frequency.

The third consideration is that of the modification of the phase-shift frequency curve. So far, reference has been made to compensation for one effect of dissipation only, namely the occurrence of a loss varying with frequency. It will be shown that the second effect, the modification of the phase-shift/frequency curve, can be compensated for by modifying the ideal reactance function in accordance with some relation to be determined, taking into account the amount of dissipation to be expected.

In this way the problem reduces to designing two types of network, one suitable for replacing ideal one-parameter reactances having an impedance of the form $Z/R_0=j\bar{a}x$, or in the case of the inverse form, $R_0/Z=j\bar{a}x$ whilst the other is suitable to replace an ideal two-parameter network having an impedance of the form $$Z/R_0=jax/(1-bx^2)$$

or in the case of the inverse form $R_0/Z=jax/(1-bx^2)$. In both cases the substitute networks must have a phase shift the same as that of the network it replaces and a flat loss.

It is convenient to express the desired phase shift $\beta$ in terms of these parameters $\bar{a}$, $a$ and $x$. Thus in the case of the one-parameter network $$Z=R_0j\bar{a}x$$

and from Equation 6 above $$Z=R_0\tanh\left(\frac{\alpha_0+j\beta}{2}\right)$$

With the ideal network, $\alpha_0=0$ so that $$j\bar{a}x=\tanh\left(j\frac{\beta}{2}\right)$$

$$=j\tan\beta/2$$

Hence $$\beta=2\tan^{-1}\bar{a}x \qquad (7)$$

With the two-parameter network $$Z=R_0j\left(\frac{ax}{1-bx^2}\right)$$

and, as before, $$Z=R_0\tanh\left(\frac{\alpha_0+j\beta}{2}\right)$$

Since $\alpha_0=0$ with the ideal network, we have $$\tanh\left(j\frac{\beta}{2}\right)=j\left(\frac{ax}{1-bx^2}\right)$$

whence $$\beta=2\tan^{-1}\left(\frac{ax}{1-bx^2}\right) \qquad (8)$$

In the substitute networks it will be assumed that the numerical value of the dissipation of all reactive elements is the same. Though this does not normally occur in practice since the dissipation of inductors is generally higher than that of capacitors, the condition can be met by increasing the dissipation artificially. Alternatively an average value of dissipation can be assumed.

The substitute networks will thus be limited to networks in which each inductance has a resistance in series with it, and each capacitance a resistance in parallel with it, so that these resistances can take up the dissipation resistances of the reactive elements.

Figure 7 is a generalised lattice network of this type, with series arms $Z/R_0$ and lattice arms $R_0/Z$ in this case the transfer constant $\theta=\alpha_0+j\beta$ is given by $\tanh\theta/2=Z/R_0$. For the one-parameter ideal network $Z/R_1=j\bar{a}x$, $\alpha_0=0$. The substitute network must have impedance Z such that $Z/R_0$ or $R_0/Z$, as the case may be, is equal to $$(C+j\bar{a}x)/(1+jC\bar{a}x)$$

where $C=\tanh\alpha_0/2$, $\alpha_0$ being the basic loss of the network. It can be shown that in the case of an inductance as shown in Figure 8(*a*) a substitute network consisting of a parallel combination of a resistance and a series combination of a pure inductance and a resistance as shown in Figure 8(*b*), can be given values such as to provide an impedance of the desired form. If the first resistance has the value, normalised with respect to $R_0$ of *e*, the second resistance the normalised value $c/Q$ and the inductance the normalised impedance value $jcx$, as indicated in Figure 8(*b*), then the desired impedance is obtained if $$C=\frac{\bar{a}}{1-\bar{a}^2/Q^2} \text{ and } e=Q/a \qquad (9)$$

where Q is the reciprocal of the dissipation constant. The elements of the network will be positive if Q is not too small. The manner of obtaining the inverse form, for example for use in a network such as that of Figure 2, will be apparent.

The corresponding substitute networks for the two-parameter reactances are shown in Figure 9. The ideal network is the parallel tuned circuit 9 (*a*), so that, as mentioned above, the characteristic impedance Z is given by $$\frac{Z}{R_0}=\frac{jax}{1-bx^2} \qquad (10)$$

and the phase shift is $$\beta=2\tan^{-1}\frac{ax}{1-bx^2} \qquad (11)$$

It is thus necessary to find an impedance Z as stated above, so that $$Z/R_0=[C+jax/(1-bx^2)]/[1+jCax/(1-bx^2)] \qquad (12)$$

Figures 9(*b*) and 9(*c*) show the required dissipative networks. Figure 9(*b*) shows a series combination of a normalized resistance F and a parallel combination of a normalised impedance $Z_1/R_0$ and a normalised impedance $DR_0/Z_1$, D being a constant defined hereinafter. It will be apparent that if a network with normalised impedance $Z_1/R_0$ is given, the network of normalised impedance $DR_0/Z_1$ is also determined as it is the network inverse to the first with respect to resistance $R_0\sqrt{D}$. Thus, only the network $Z_1/R_0$ need be determined.

The impedance $Z_1/R_0$ takes the form, shown in Figure 9, of a parallel combination of a resistance of normalised value *e* and a series combination of a normalised resistance of value $c/Q$ and an inductance with normalised impedance $jcx$ the values being defined by the following relations:

$$c=AQ^3/(Q^2-b) \qquad (13)$$

$$e=AQ^2/b \qquad (14)$$

$$D=A^2Q^2/b \qquad (15)$$

$$A=\frac{a^2(b+Q^2)^2-16b^2Q^2}{Qa(b-Q^2)^2} \qquad (16)$$

$$F=\frac{(4b-a^2)(b+Q^2)Q}{a(b-Q^2)^2} \qquad (17)$$

With this network the basic loss is given by $$\alpha_0=2\tanh^{-1}\frac{4bQ}{a(b+Q^2)}$$

Figure 9(*c*) shows the second network which can be substituted for the two-parameter dissipative networks. It consists of a parallel combination of an impedance $Z_1/R_0$, a normalised resistance F and an impedance $DR0/Z_1$. In this case the impedance $Z_1/R_0$ takes the same form, shown in Figure 9, as for the network of Figure 9(*b*) and relations (13), (14), and (15) apply. In place of Equations 16 and 17, the following holds:

$$A=\frac{a(Q^2-b)^2}{[(b+Q^2)^2-a^2Q^2]Q} \qquad (18)$$

$$F=\frac{a(Q^2-b)^2}{(a^2-4b)(b+Q^2)Q} \qquad (19)$$

With this network the basic loss is given by:

$$\alpha_0=2\tanh^{-1}\left(\frac{aQ}{b+Q^2}\right) \qquad (20)$$

As explained above Q is the normal reciprocal of the dissipation constant and for an inductance L with effective series resistance $R_L$ is given by $$Q=(2\pi f_{\text{ref}}L)/R_L \qquad (21)$$

and for a capacitance C with shunt resistance $R_c$ is given by $$Q=2\pi f_{\text{ref}}CR_c \qquad (22)$$

In Figure 9(*c*) it is, of course, possible to absorb the normalised resistance F in $Z_1/R_0$. It will be seen that F is negative in Figure 9(*b*) if $a^2>4b$ and negative in Figure 9(*c*) if $a^2<4b$. In Figure 9(*c*) $F<0$ does not make the network necessarily non-physical.

If $a^2\geqslant 4b$ the phase shift network defined by the series arm reactance in Figure 9(*a*) can be replaced by two simpler networks in tandem of the type defined by the series impedance in Figure 8(*a*).

One use of a dissipation compensated network in accordance with the invention is in phase splitting networks of the type described in application Ser. No. 169,303, now Patent No. 2,661,458, of which this application is a continuation-in-part application.

I claim:

1. An elementary phase shift dissipation-compensated network for producing over an extended frequency range a constant loss and a phase shift $\beta 1$ in radians defined by the relation:

$$\beta 1=2\tan^{-1}\bar{a}x$$

where $\bar{a}$ is a real and positive constant and $x$ is the normalized frequency, expressed as the ratio $x=f/f_0$, where $f$ is the frequency and $f_0$ is an arbitrary reference frequency, said network corresponding to an ideal elementary phase shift network the reactances of which are dissipation-free and which produces a constant loss, which may be zero, and a phase shift $\beta 2$ defined by the relation $$\beta 2=2\tan^{-1}\bar{a}x$$

the reactances of the ideal network which are positive having an impedance $Z_2$ defined by the relations:

$$Z_2=R_0\tanh j\beta/2=jR_0\tan\beta/2=jR_0\bar{a}x$$

where $R_0$ is an arbitrary and constant value of resistance and the reactances of the ideal network which are negative have the inverse form of the positive reactances and are of value $R_0^2/Z_2$, the said dissipation-compensated network comprising in the position of a reactance of the ideal network a substitution impedance having an impedance $Z_1$ which is defined by the relation $$Z_1=R_0\tanh(\alpha_0+j\beta_1)/2$$

where $$\alpha_0=(\alpha_1-\alpha_2)$$

where $\alpha_1$ is the loss, in nepers, of the dissipation-compensated network and $\alpha_2$ that of the said corresponding ideal network, said substitution impedance consisting of the parallel combination of a first branch consisting of resistive component of value $QR_0/\bar{a}$, with a second branch consisting of a reactive component of value $jR_0cx$ and a resistive component of value $CR_0/Q$ where $c$ is defined by the relation $$c=\bar{a}/(1-\bar{a}^2/Q^2)$$

and Q is the ratio of the reactance to resistance of the respective components of the said first branch at the normalized frequency $x=1$, and comprising in the position of a reactance of the ideal network which is of the inverse form, an impedance which is of inverse form, with respect to $R_0$, of said substitution impedance.

2. An elementary phase shift network in which the effect of the dissipative component inherent in the impedance of the nominally reactive elements is counteracted by the effect of additional purely dissipative elements introduced into the network to provide a dissipation compensated network which produces a constant loss $\alpha_1$ in nepers, over an extended frequency range and a phase shift $\beta_1$, in radians, defined by the relation $$\beta_1=2\tan^{-1}\bar{a}x$$

where $\bar{a}$ is a real and positive constant and $x$ is the normalized frequency $f/f_0$, $f$ being the frequency at which the phase shift is determined and $f_0$ an arbitrary reference frequency, said network corresponding to an ideal elementary phase shift network, ideal in the sense that it employs only reactive elements which have no inherent dissipative component, said reactive elements which are positive having an impedance $Z_2$ such that $$Z_2=R_0\tanh j\beta/2=jR_0\tan\beta/2=jR_0\bar{a}x$$

and those which are negative having an impedance $R_0^2/Z_2$, where $R_0$ is an arbitrary and constant value of resistance, said ideal network producing a constant loss $\alpha_2$ which may be zero, in nepers, over an extended frequency range and a phase shift $\beta_2$, in radians, such that $$\beta_1=\beta_2=2\tan^{-1}\bar{a}x$$

and in which said positive reactive elements correspond to circuit elements in the dissipation-compensated network having an impedance $$Z_1=R_0\tanh\frac{\alpha_0+j\beta_1}{2}$$

where $\alpha_0=\alpha_1-\alpha_2$ and comprising a parallel combination of a purely dissipative element of value $QR_0/\bar{a}$ and a dissipative positive reactive element represented by a series combination of a non-dissipative positive reactance of impedance value $jR_0Cx$ and a purely dissipative component of impedance value $$\frac{CR_0}{Q}$$

where $$C=\frac{\bar{a}}{1-\bar{a}^2/Q^2}$$

and Q is the ratio of the impedance of said non-dissipative positive reactance at the reference frequency $f_0(x=1)$ to the impedance of said purely dissipative component, and in which said negative reactive elements of the ideal network correspond to circuit elements in the dissipation compensated network having impedances which are the inverse with respect to $R_0$ of those of the positive reactive elements.

3. An elementary dissipation-compensated phase shift network for producing a phase shift $\beta_1$ in radians defined by the relation $$\beta_1=2\tan^{-1}\left(\frac{ax}{1-bx^2}\right)$$

where $x$ is the normalized frequency, expressed as the ratio $x=f/f_0$, where $f$ is the frequency and $f_0$ is an arbitrary reference frequency and $a$ and $b$ are real and positive constants, and for producing substantially constant loss over an extended frequency range, said network corresponding to an ideal elementary phase shift network the reactances of which are dissipation-free and which produces a constant loss, which may be zero, and a phase shift $\beta_2$ defined by the relation $$\beta_2=2\tan^{-1}\left(\frac{ax}{1-bx^2}\right)$$

in which the dissipation-free reactances of the ideal network are replaced by substitution impedances, said substitution impedances having a characteristic impedance Z defined by the relation $$Z=R_0\tanh(\alpha_0+j\beta)/2$$

where $R_0$ is an arbitrary and constant value of resistance, $\alpha_0$ is difference, in nepers, between the loss of the dissipation compensated network and that of the said corresponding ideal network, said substitution impedance comprising in the position in the ideal network of an ideal parallel resonant circuit of normalized impedance $$jax/(1-bx^2)$$

a resistance, of normalized value F, in series with a parallel combination of two impedances $Z_1/R_0$ and $DR_0/Z_1$, where $Z_1/R_0$ is a parallel combination of a first branch consisting of a series combination of a resistive component of normalized value $c/Q$ and an inductive impedance component of value $jcx$, and a second branch consisting of a resistive component of normalized value $e$ all as defined by the relations:

$$c=AQ^3/(Q^2-b)$$

where $b$ is as defined above $$e=AQ^2/b$$

$$D=A^2Q^2/b$$

$$A=\frac{a^2(b+Q^2)^2-16b^2Q^2}{Qa(b-Q^2)^2}$$

$$F=\frac{(4b-a^2)(b+Q^2)Q}{a(b-Q^2)^2}$$

and Q is the ratio of reactance to resistance of the respective components of the said first branch and in which the inverse forms of the ideal elementary phase shift network are replaced by the inverse forms of said substitution impedances.

4. An elementary dissipation-compensated phase shift network for producing a phase shift $\beta_1$ in radians defined by the relation $$\beta_1=\tan^{-1}\left(\frac{ax}{1-bx^2}\right)$$

where $x$ is the normalized frequency, expressed as the ratio $x=f/f_0$, where $f$ is the frequency and $f_0$ is an arbitrary reference frequency, and $a$ and $b$ are real and positive constants, and for producing substantially constant loss over an extended frequency range, said network corresponding to an ideal elementary phase shift network the reactances of which are dissipation-free and which produces a constant loss, which may be zero, and a phase shift $\beta_2$ defined by the relation $$\beta_2=\tan^{-1}\left(\frac{ax}{1-bx^2}\right)$$

in which the dissipation-free reactances of the ideal network are replaced by substitution impedances, said substitution impedances having a characteristic impedance Z defined by the relation $$Z=R_0\tanh(\alpha_0+j\beta)/2$$

where $R_0$ is an arbitrary and constant value of resistance, $\alpha_0$ is difference, in nepers, between the loss of the dissipation compensated network and that of the said corresponding ideal network, said substitution impedances comprising in the position, in the ideal network of an ideal parallel resonant circuit of normalized impedance $$jax/(1-bx^2)$$

a resistance, of normalized value F, in parallel with an impedance of value $Z_1/R_0$ and an impedance of value $DR_0/Z_1$, where the impedance of value $Z_1/R_0$ is a parallel combination of a first branch comprising a resistive component of normalized value $c/Q$ in series with an inductive component of normalized value $jcx$ and a second branch consisting of a resistance of normalized value $e$ all as defined by the relations $$c=AQ^3/(Q^2-b)$$

$$e=AQ^2/b$$

$$D=A^2Q^2/b$$

$$A=\frac{a(Q^2-b)^2}{[(b+Q^2)^2-a^2Q^2]Q}$$

$$F=\frac{a(Q^2-b)^2}{(a^2-4b)(b+Q^2)Q}$$

and Q is the ratio of reactance to resistance of the respective components of the said first branch, and in which the inverse forms of the ideal elementary phase shift network are replaced by the inverse forms of said substitution impedances.

References Cited in the file of this patent

UNITED STATES PATENTS 2,228,869 Chireix ---------------- Jan. 14, 1941